United States Patent
Lainez et al.

(10) Patent No.: US 9,530,400 B2
(45) Date of Patent: Dec. 27, 2016

(54) SYSTEM AND METHOD FOR COMPRESSED DOMAIN LANGUAGE IDENTIFICATION

(71) Applicant: Nuance Communications, Inc., Burlington, MA (US)

(72) Inventors: Jose Lainez, London (GB); Daniel Almendro Barreda, London (GB)

(73) Assignee: Nuance Communications, Inc., Burlington, MA (US)

( * ) Notice: Subject to any disclaimer, the term of this patent is extended or adjusted under 35 U.S.C. 154(b) by 313 days.

(21) Appl. No.: 14/499,867

(22) Filed: Sep. 29, 2014

(65) Prior Publication Data
US 2016/0093290 A1 Mar. 31, 2016

(51) Int. Cl.
| | |
|---|---|
| *G10L 15/00* | (2013.01) |
| *G10L 15/16* | (2006.01) |
| *G06F 17/30* | (2006.01) |
| *H04M 3/42* | (2006.01) |
| *G06N 3/08* | (2006.01) |
| *H04M 3/51* | (2006.01) |

(52) U.S. Cl.
CPC ....... *G10L 15/005* (2013.01); *G06F 17/30707* (2013.01); *G10L 15/16* (2013.01); *H04M 3/42* (2013.01); *H04M 3/51* (2013.01); *H04M 2203/2061* (2013.01); *H04M 2242/12* (2013.01)

(58) Field of Classification Search
CPC ...... H04M 2242/12; H04M 3/42; H04M 3/51; H04M 2203/2061; G10L 15/005; G10L 15/16; G10L 25/00; G10L 15/20; G10L 21/06; G10L 15/02; G06F 17/30707; G06N 3/08

USPC ................ 704/232, 233, 245, 250
See application file for complete search history.

(56) References Cited

U.S. PATENT DOCUMENTS

| | | | | |
|---|---|---|---|---|
| 2015/0058004 | A1* | 2/2015 | Dimitriadis | G10L 25/78 704/233 |
| 2015/0279220 | A1* | 10/2015 | Ming | G09B 7/00 434/350 |
| 2015/0279222 | A1* | 10/2015 | Tian | G09B 7/02 434/351 |

(Continued)

OTHER PUBLICATIONS

H.K. Kim, S.H. Choi, H.S. Lee, "On Approximating Line Spectral Frequencies to LPC Cepstral Coefficients," IEEE Transactions on Speech and Audio Processing, 8(2), 195-199, (Mar. 2000).

*Primary Examiner* — Thierry L Pham
(74) *Attorney, Agent, or Firm* — Holland & Knight LLP; Mark H. Whittenberger, Esq.

(57) ABSTRACT

Embodiments included herein are directed towards a system and method for compressed domain language identification. Embodiments may include receiving a bitstream of a sequence of packets at one or more computing devices and classifying each packet into speech or non-speech based upon, at least in part, compressed domain voice activity detection (VAD). Embodiments may further include extracting a pseudo-cepstral representation from the speech detected packets and partially decoding without extracting a PCM format and generating a sequence of multi-frames, based upon, at least in part, the pseudo-cepstral representation. Embodiments may also include providing in real time the sequence of multi-frames to a deep neural network (DNN), wherein the DNN has been trained off-line for one or more desired target languages.

20 Claims, 5 Drawing Sheets

(56) References Cited

U.S. PATENT DOCUMENTS

2016/0064007 A1\* 3/2016 Villemoes ............... G10L 19/02
704/203

\* cited by examiner

SYSTEM AND METHOD FOR COMPRESSED DOMAIN LANGUAGE IDENTIFICATION

TECHNICAL FIELD

This disclosure relates to speech recognition systems and, more particularly, to a system and method for automatic language identification in a compressed domain.

BACKGROUND

In a telecommunications system it is often useful to detect the language associated with a particular call. This can lead to several applications, for example, the automatic routing in a multi-lingual call center to the adequate operator or automatic speech recognition (ASR) queue, or for surveillance purposes as a first stage in the search of suspects that speak in a specific language. State of the art automatic language identification systems operate using pulse code modulation (PCM) and require the bit-stream to be decoded, a feature extraction representation to be computed, and the main recognition algorithm to be run.

Summary of Disclosure

In one implementation, a computer-implemented method for compressed domain language identification is provided. The method may include receiving a bitstream of a sequence of packets at one or more computing devices and classifying each packet into speech or non-speech based upon, at least in part, compressed domain voice activity detection (VAD). Embodiments may further include extracting a pseudo-cepstral representation from the speech detected packets and partially decoding without extracting a PCM format and generating a sequence of multi-frames, based upon, at least in part, the pseudo-cepstral representation. Embodiments may also include providing in real time the sequence of multi-frames to a deep neural network (DNN), wherein the DNN has been trained off-line for one or more desired target languages.

One or more of the following features may be included. In some embodiments, the method may include automatically detecting a language associated with the bitstream of the sequence of packets. The method may further include extracting includes extracting from a non-decoded bitstream of the sequence of packets. In some embodiments, extracting may include a delta computation and a delta-delta computation. The method may include discarding one or more non-speech frames using a compressed domain voice activity detector (VAD). In some embodiments, the DNN may be configured to classify the bitstream as belonging to a particular language. The method may include averaging a logarithm of posterior possibilities of the DNN across one or more packets to detect the particular language. The method may include detecting a language associated with the bitstream of the sequence of packets without decoding into a pulse code modulated format. The method may further include receiving an output score from the DNN and combining the output score with a pulse code modulated (PCM) language identification system score. The method may also include performing an action based upon the classification, wherein the action includes at least one of, automatically routing a call in a call center, non-intrusively obtaining statistics regarding language usage in a network, and performing speaker identification.

In another implementation, a system configured for compressed domain language identification is provided. The system may include one or more processors configured to execute operations. Operations may include receiving a bitstream of a sequence of packets at one or more computing devices and classifying each packet into speech or non-speech with a compressed domain voice activity detection (VAD). Embodiments may further include extracting a pseudo-cepstral representation from the speech detected packets and partially decoding without extracting a PCM format and generating a sequence of multi-frames, based upon, at least in part, the pseudo-cepstral representation. Embodiments may also include providing in real time the sequence of multi-frames to a deep neural network (DNN), wherein the DNN has been trained off-line for one or more desired target languages.

One or more of the following features may be included. In some embodiments, operations may include automatically detecting a language associated with the bitstream of the sequence of packets. Operations may further include extracting includes extracting from a non-decoded bitstream of the sequence of packets. In some embodiments, extracting may include a delta computation and a delta-delta computation. Operations may include discarding one or more non-speech frames using a compressed domain voice activity detector (VAD). In some embodiments, the DNN may be configured to classify the bitstream as belonging to a particular language. Operations may include averaging a logarithm of posterior possibilities of the DNN across one or more packets to detect the particular language. Operations may include detecting a language associated with the bitstream of the sequence of packets without decoding into a pulse code modulated format. Operations may further include receiving an output score from the DNN and combining the output score with a pulse code modulated (PCM) language identification system score. Operations may also include performing an action based upon the classification, wherein the action includes at least one of, automatically routing a call in a call center, non-intrusively obtaining statistics regarding language usage in a network, and performing speaker identification.

The details of one or more implementations are set forth in the accompanying drawings and the description below. Other features and advantages will become apparent from the description, the drawings, and the claims.

BRIEF DESCRIPTION OF THE DRAWINGS

Like reference symbols in the various drawings may indicate like elements.

DETAILED DESCRIPTION

Embodiments provided herein are directed towards a system and method for automatic language identification in a compressed domain. Accordingly, embodiments included herein may solve the problem of detecting the target language of a call in the compressed domain. This may be performed directly from a pseudocepstrum representation computed very efficiently from the codec parameters, without the need for decoding into the pulse code modulation (PCM) space. Apart of the computational improvements that imply the operation in the compressed domain, the PCM is not needed and the system will not break any privacy agreement that may exist. Therefore, the more expensive computations of the feature extraction may be avoided by working directly in a pseudo-cepstrum representation. Embodiments included herein may utilize deep neural network (DNN) technology, which may be used to accurately model the language of pseudo-cepstrum multi-frames.

The term "bitstream" as used herein, may refer to a sequence of non-decoded packets of a speech codec (e.g., CELP codecs: G729/AMR, etc.) that may be given as an input to the proposed language identification system and method.

Figure 1:
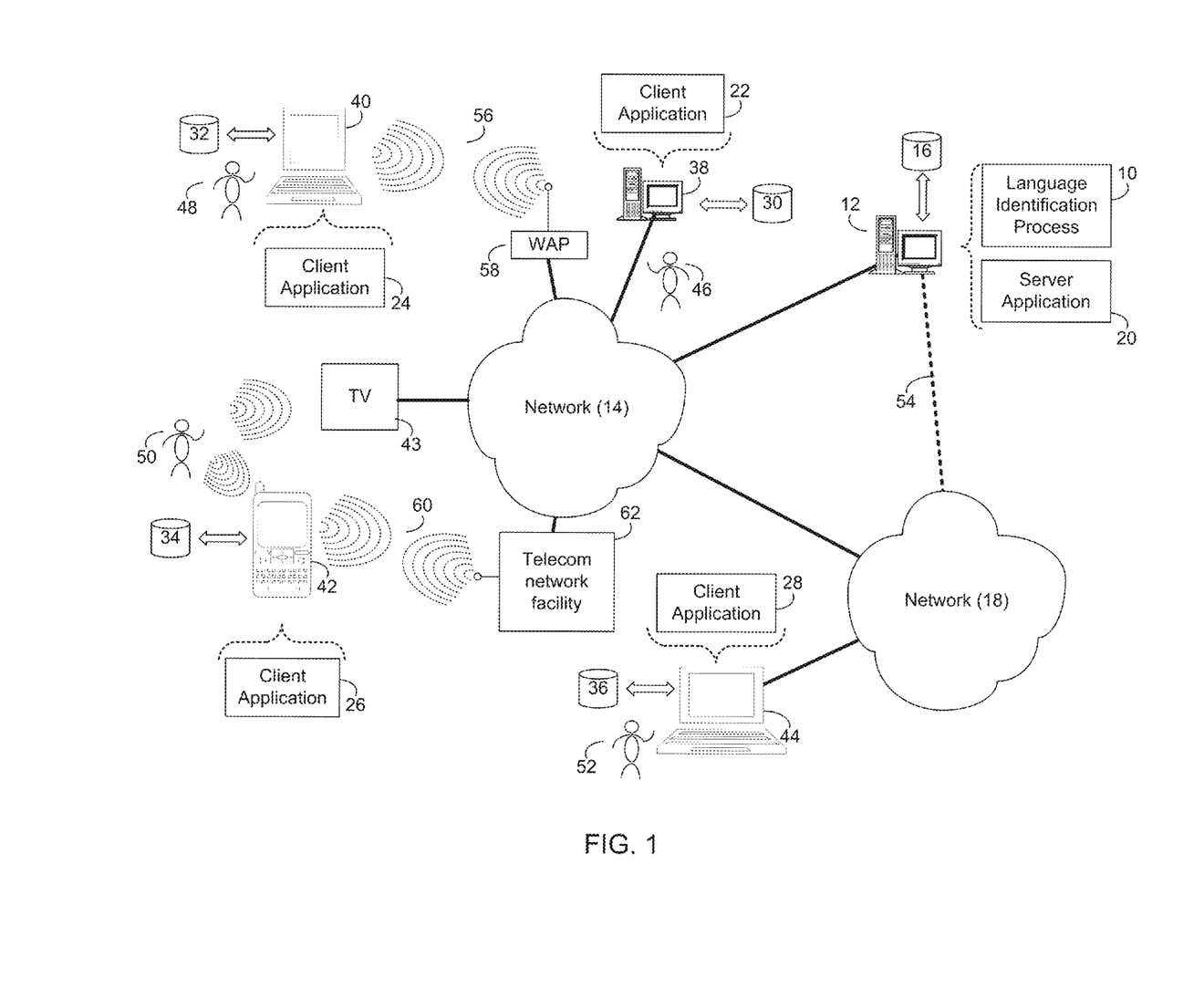
FIG. 1 is a diagrammatic view of a language identification process in accordance with an embodiment of the present disclosure.

Referring to FIG. 1, there is shown a language identification process 10 that may reside on and may be executed by computer 12, which may be connected to network 14 (e.g., the Internet or a local area network). Server application 20 may include some or all of the elements of language identification process 10 described herein. Examples of computer 12 may include but are not limited to a single server computer, a series of server computers, a single personal computer, a series of personal computers, a mini computer, a mainframe computer, an electronic mail server, a social network server, a text message server, a photo server, a multiprocessor computer, one or more virtual machines running on a computing cloud, and/or a distributed system. The various components of computer 12 may execute one or more operating systems, examples of which may include but are not limited to: Microsoft Windows Server™; Novell Netware™; Redhat Linux™, Unix, or a custom operating system, for example.

As will be discussed below in greater detail in FIGS. 2-5, language identification process 10 may include receiving (202) a bitstream of a sequence of packets at one or more computing devices and classifying (204) each packet into speech or non-speech based upon, at least in part, compressed domain voice activity detection (VAD). Embodiments may further include extracting (206) a pseudo-cepstral representation from the speech detected packets and partially decoding without extracting a PCM format and generating (208) a sequence of multi-frames, based upon, at least in part, the pseudo-cepstral representation. Embodiments may also include providing (210) in real time the sequence of multi-frames to a deep neural network (DNN), wherein the DNN has been trained off-line for one or more desired target languages.

Figure 2:
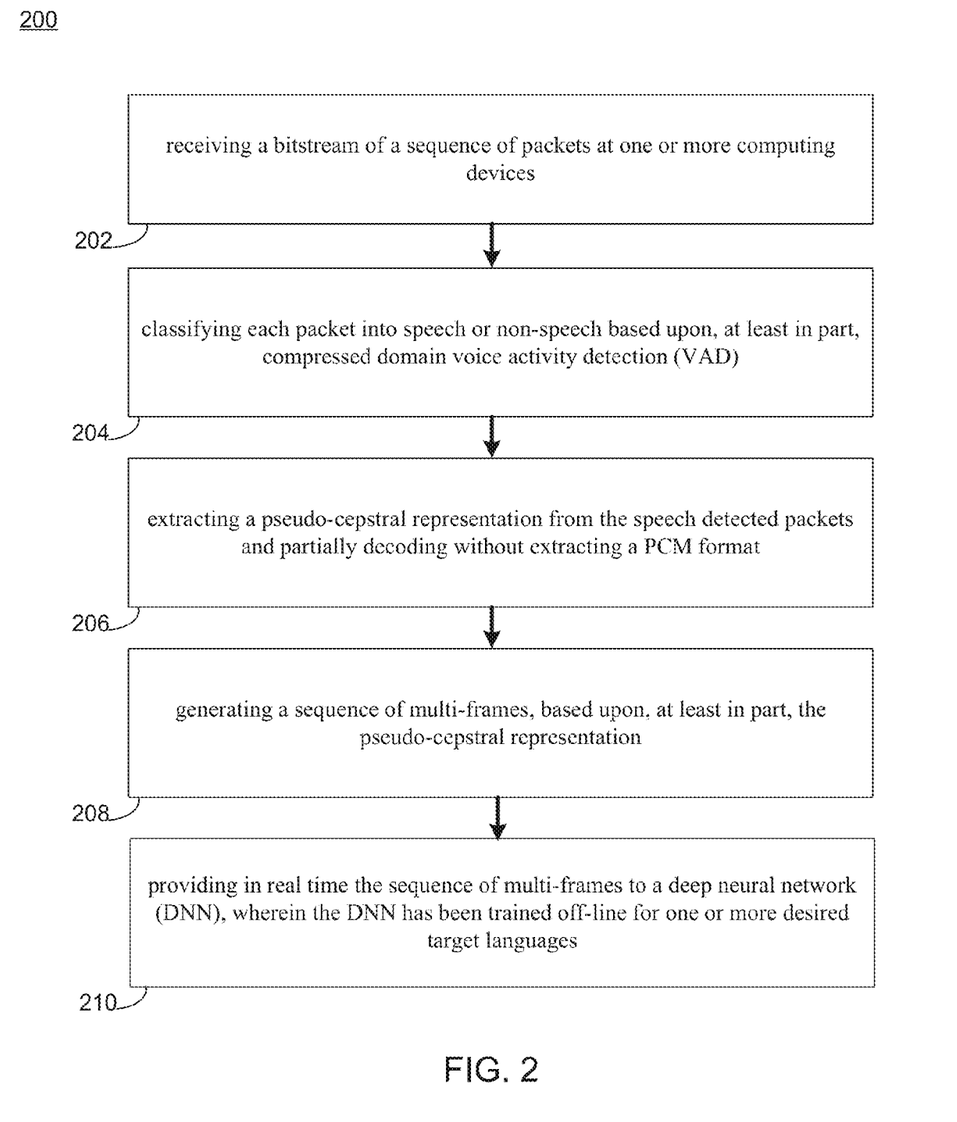
FIG. 2 is a flowchart of a language identification process in accordance with an embodiment of the present disclosure.

In some embodiments, the sequence of processing stages of module 200 may include 202: a sequence of packets, 204: a sequence of frames of static, delta and delta-delta pseudo-cepstral feature vectors, 206: a sequence of multi-frames, 208: the sequence of multi-frames may be fed in real-time into the DNN.

The instruction sets and subroutines of language identification process 10, which may be stored on storage device 16 coupled to computer 12, may be executed by one or more processors (not shown) and one or more memory architectures (not shown) included within computer 12. Storage device 16 may include but is not limited to: a hard disk drive; a flash drive, a tape drive; an optical drive; a RAID array; a random access memory (RAM); and a read-only memory (ROM).

Network 14 may be connected to one or more secondary networks (e.g., network 18), examples of which may include but are not limited to: a local area network; a wide area network; or an intranet, for example.

In some embodiments, language identification process 10 may reside in whole or in part on one or more client devices and, as such, may be accessed and/or activated via client applications 22, 24, 26, 28. Examples of client applications 22, 24, 26, 28 may include but are not limited to a standard web browser, a customized web browser, or a custom application that can display data to a user. The instruction sets and subroutines of client applications 22, 24, 26, 28, which may be stored on storage devices 30, 32, 34, 36 (respectively) coupled to client electronic devices 38, 40, 42, 44 (respectively), may be executed by one or more processors (not shown) and one or more memory architectures (not shown) incorporated into client electronic devices 38, 40, 42, 44 (respectively).

Storage devices 30, 32, 34, 36 may include but are not limited to: hard disk drives; flash drives, tape drives; optical drives; RAID arrays; random access memories (RAM); and read-only memories (ROM). Examples of client electronic devices 38, 40, 42, 44 may include, but are not limited to, personal computer 38, laptop computer 40, smart phone 42, television 43, notebook computer 44, a server (not shown), a data-enabled, cellular telephone (not shown), and a dedicated network device (not shown).

One or more of client applications 22, 24, 26, 28 may be configured to effectuate some or all of the functionality of language identification process 10. Accordingly, language identification process 10 may be a purely server-side application, a purely client-side application, or a hybrid server-side/client-side application that is cooperatively executed by one or more of client applications 22, 24, 26, 28 and language identification process 10.

Client electronic devices 38, 40, 42, 44 may each execute an operating system, examples of which may include but are not limited to Apple iOS™, Microsoft Windows™, Android™, Redhat Linux™, or a custom operating system.

Users 46, 48, 50, 52 may access computer 12 and language identification process 10 directly through network 14 or through secondary network 18. Further, computer 12 may be connected to network 14 through secondary network 18, as illustrated with phantom link line 54. In some embodiments, users may access language identification process 10 through one or more telecommunications network facilities 62.

The various client electronic devices may be directly or indirectly coupled to network 14 (or network 18). For example, personal computer 38 is shown directly coupled to network 14 via a hardwired network connection. Further, notebook computer 44 is shown directly coupled to network 18 via a hardwired network connection. Laptop computer 40 is shown wirelessly coupled to network 14 via wireless communication channel 56 established between laptop computer 40 and wireless access point (i.e., WAP) 58, which is shown directly coupled to network 14. WAP 58 may be, for example, an IEEE 802.11a, 802.11b, 802.11g, Wi-Fi, and/or Bluetooth device that is capable of establishing wireless communication channel 56 between laptop computer 40 and WAP 58. All of the IEEE 802.11x specifications may use Ethernet protocol and carrier sense multiple access with collision avoidance (i.e., CSMA/CA) for path sharing. The various 802.11x specifications may use phase-shift keying (i.e., PSK) modulation or complementary code keying (i.e., CCK) modulation, for example. Bluetooth is a telecommunications industry specification that allows e.g., mobile phones, computers, and smart phones to be interconnected using a short-range wireless connection.

Smart phone 42 is shown wirelessly coupled to network 14 via wireless communication channel 60 established between smart phone 42 and telecommunications network facility 62, which is shown directly coupled to network 14.

In some embodiments, some or all of the devices shown in FIG. 1 may be or may include encoders, decoders, or any combination thereof. The term "codec" as used herein may refer to a device or computer program capable of encoding and/or decoding a digital data stream or signal.

Figure 3:
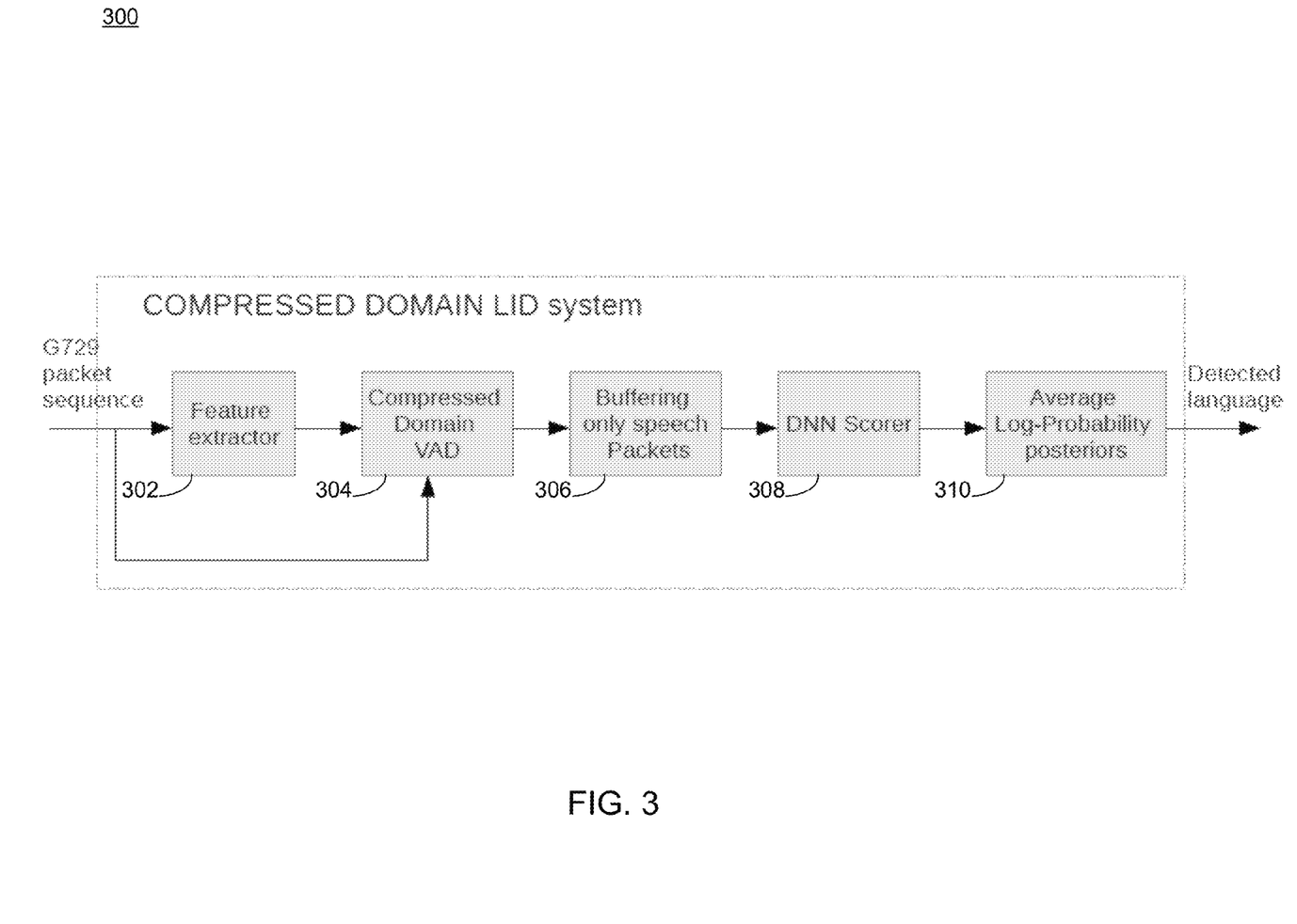
FIG. 3 is a diagrammatic view of an embodiment of a language identification process consistent with embodiments of the present disclosure.
Figure 4:
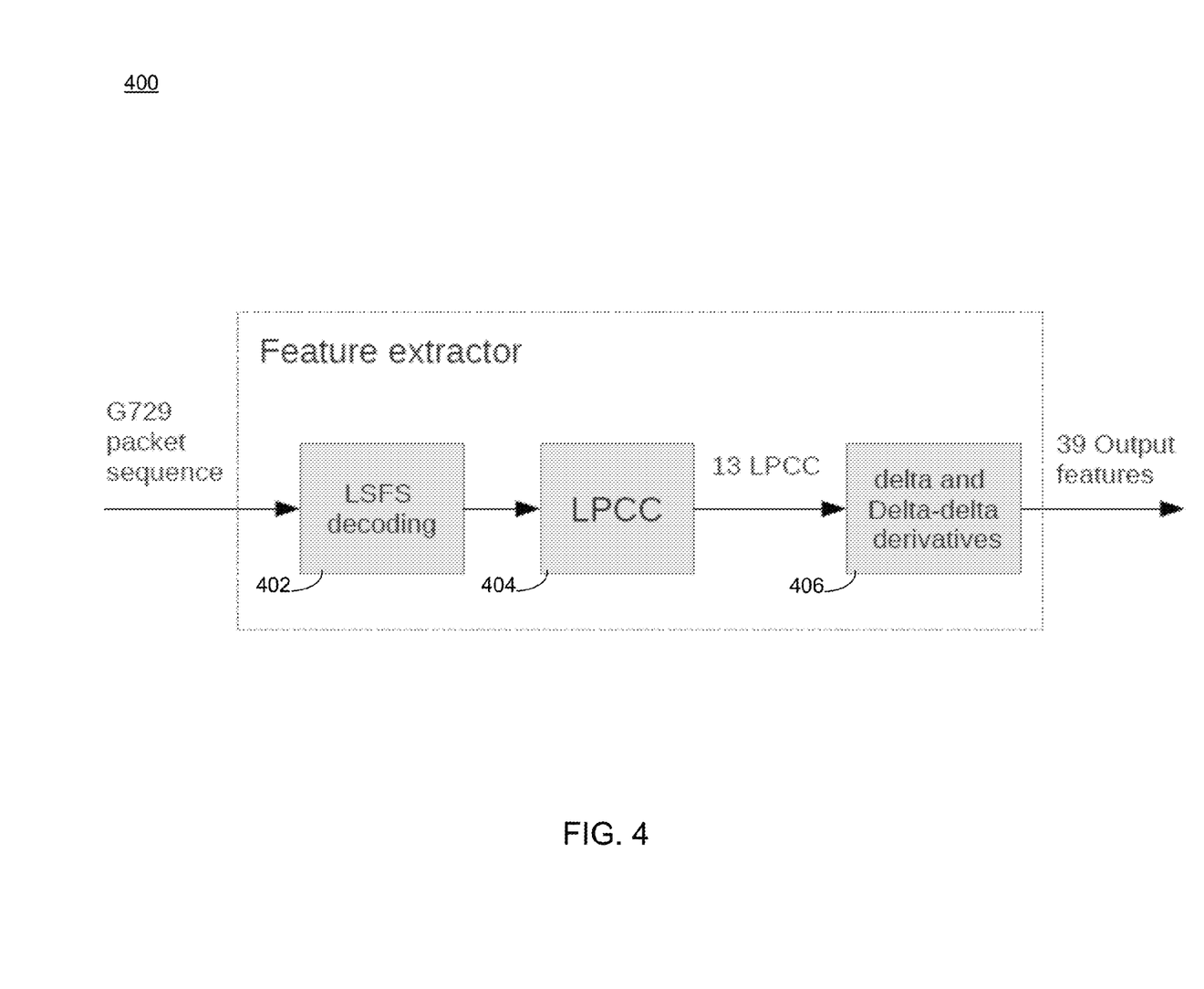
FIG. 4 is a diagrammatic view of an embodiment of a language identification process consistent with embodiments of the present disclosure.

Referring now to FIGS. 3-4, embodiments of language identification process 10 may operate in the compressed domain and may be configured to analyze packets coded with a code-excited linear prediction ("CELP") codec (e.g., G729, adaptive multi-rate ("AMR"), etc.). In some embodiments, a partial decoding representation may be extracted and processed to obtain one or more pseudo linear prediction ceptral coefficients ("LPCC") from the decoded line spectral frequencies ("LSFs").

As is shown in FIG. 3, an embodiment depicting a compressed domain language identification system 300 consistent with language identification process 10 is provided. System 300 may receive one or more packets at a feature extractor module 302 (shown in greater detail in FIG. 4), which may be configured to generate an output for use by compressed domain voice activity detector ("VAD") module 304. VAD module 304 may be in communication with buffering module 306, which may be configured to buffer only speech packets and generate multi-frames that feed the DNN. System 300 may also include deep neural network ("DNN") scorer 308 and average logarithmic probability posteriors module 310. Accordingly, in some embodiments, the logarithm of the posterior probabilities of the DNN may be averaged across all the speech packets of the call to detect the target language. System 300 may be used to detect a particular language associated with the incoming packet sequence as is discussed in further detail hereinbelow.

Referring again to FIG. 4, an embodiment of language identification process 10 depicting a feature extractor 400 is provided. In this particular embodiment, feature extraction may include the LPCC parameters via LPCC module 404 and/or the partial decoding of G.729 codec, including, for example, LSFs via LSFS module 402, fixed/adaptive codebook gains, and fixed/adaptive codebook vectors. Some embodiments may further include a delta and delta-delta derivatives module 406 that may be configured to compute the first and second derivatives of the basic feature representation.

In some embodiments, language identification process 10 may be configured to compute a pseudo-cepstral representation very efficiently from the decoded: LSF parameters, with a negligible computational load and may improve the performance of the system compared to a partially decoded feature vector. In a particular embodiment of language identification process 10, 13 static LPCCs along with the first and second derivatives may be extracted comprising a 39 dimensional feature vector for each packet. An example of a pseudo-cepstral representation may be found, for example, in H. K. Kim, S. H. Choi, H. S. Lee, *On Approximating Line Spectral Frequencies to LPC Cepstral Coefficients*, IEEE Trans. Acoust. Speech Audio Process. 8 (2) (2000) 195-199.

In CELP codecs, Linear Predictive Coefficients (LPC) that contain information of the short term spectral envelope are usually estimated and converted into Line Spectral Frequencies (LSF) that are quantized and inserted into a packet. LSF and LPC coefficients contain similar information, however the former usually are quantized in speech codecs because of its known robustness to quantization errors. Linear Predictive Cepstral Coefficients (LPCC) is a cepstral representation that can be computed from the LPC coefficients. Alternatively, a pseudo-cepstrum similar to the LPCC can be computed directly from the LSFs as is discussed in Kim.

In some embodiments, a compressed domain VAD may be used to detect speech and silence frames, such that a multi-frame of 200 ms may be composed by concatenating the required number of speech packets (e.g., 20 speech packets may be concatenated in G729 codec as each packet contains 10 ms of audio). This multi-frame may be fed into a DNN as is discussed in further detail hereinbelow.

In some embodiments, the DNN may have been previously trained with a labeled database of multi-frames of pseudo-cepstral coefficients for the desired target languages. During a test phase, the logarithm of probability posteriors of the output of the DNN may be averaged, obtaining a score for each target language.

Embodiments of language identification process 10 and the compressed domain system described herein may be used in accordance with any suitable application, such as those in network environments. Some of these may include, but are not limited to, pure compressed domain automatic language identification as well as fusion of the compressed domain system with a pulse code modulation ("PCM") based system. For example, in the pure compressed domain automatic language identification system no privacy agreement will be broken as the PCM is not needed. In the fusion example where the proposed compressed domain system may be combined with a PCM domain engine, the proposed compressed domain system may be very fast and may be combined with a PCM automatic language identification ("ALI") engine to improve the overall performance of the system with a negligible increase in computational load.

In some embodiments, language identification process 10 may use features from the partial decoding vector of G.729 codec. The partial decoding vector may include, but is not limited to, LSFs, fixed codebook gains, adaptive codebook gains and pitch lags. Additionally and/or alternatively, in some embodiments, language identification process 10 may use the LPCC coefficients as features.

As discussed herein, embodiments of language identification process 10 may include a compressed domain system that may be configured to operate in the codec parameters of a CELP codec (e.g. G.729) to detect the language of a communication without the need for decoding into the PCM. Language identification process 10 may be configured to classify any suitable language (e.g., en-US, es-US, etc.).

In some embodiments, language identification process 10 may include a compressed domain voice activity detector configured to discard non-speech frames. Embodiments of the present disclosure may use one or more VAD algorithms. Additional information regarding VAD may be found in United States Patent Publication Number 2011/0184732 having an application Ser. No. 13/079,705, which is incorporated herein by reference in its entirety. Embodiments of language identification process 10 may include a classifier (e.g., a DNN with rectified linear units and an output softmax layer) that may be configured to extract the probability of each multi-frame (i.e. 200 ms length) to belong to any of the target languages. By way of example, the topology of the DNN may include, but is not limited to, 200 neurons per layer and 8 layers.

In some embodiments, the classifier may have been previously trained offline with a database of labeled audio files belonging to any of the target languages. One or more algorithms such as a mini-batch stochastic gradient descent with momentum may be used if the classifier is a DNN.

In some embodiments, the DNN based system of language identification process 10 may be used with a variety of different types of language identification applications. Some of these may include, but are not limited to, a pure compressed domain language identification system and a PCM-based language identification system. In the example of the pure compressed domain system it may be used to detect the language a call belongs to without decoding into the PCM. Moreover, no privacy agreement would be broken if it may exist, which may be useful to be advertised as a non-intrusive product.

In some embodiments, language identification process 10 may utilize a PCM-based language identification system, which may combine the compressed domain DNN system described herein with any PCM-based language identification system. In some embodiments, logistic regression preceded by zero mean and unit variance normalization may be used as a back-end to combine the scores of any PCM based language identification system with language identification process 10 and the compressed domain system included herein. It should be noted that any suitable back-end (e.g., Gaussian back-end, adaptive gaussian back-end, etc.) may also be used in accordance with the teachings of the present disclosure. In some embodiments, the output scores of the compressed domain DNN system for all the target languages along with the scores of the PCM language identification system may be used as input features to the logistic regression classifier.

As discussed herein, embodiments of language identification process 10 may be used to identify a particular language associated with an audio or speech signal. The language supplied by the language identification system may be used in any suitable application. Some of these may include, but are not limited to, automatically routing a call in a call center, as a previous stage prior to perform speaker identification or speaker recognition, and/or to non-intrusively gather statistics of the language usage in a network, without breaking any privacy law.

Embodiments of language identification process 10 do not require that the bitstream be fully decoded into the PCM, and only the relevant parameters are extracted (e.g., LSFs). In some embodiments, the only operations performed in the feature extraction phase may be the pseudo-cepstrum computation and the delta and delta-delta, which may be performed with very low computational cost. One example of a topology that may be used for the DNN yields competitive results and is not complex (e.g., 200 neurons per layer and 8 layers for en-US/es-US).

It should be noted that embodiments disclosed herein may be incorporated into any product that operates in voice over internet protocol ("VoIP") network environment, which may be configured to process thousands of calls to offer language identification capabilities. The compressed domain operation may be sold as a non-intrusive operation that does not require the PCM to be extracted and may preserve the privacy rights of the users that are making calls in the system. Additionally and/or alternatively, embodiments of language identification process 10 may be used in network environments to improve the performance of a PCM-based ALI system by combining the scores of each, for example, using a logistic regression back-end.

Figure 5:
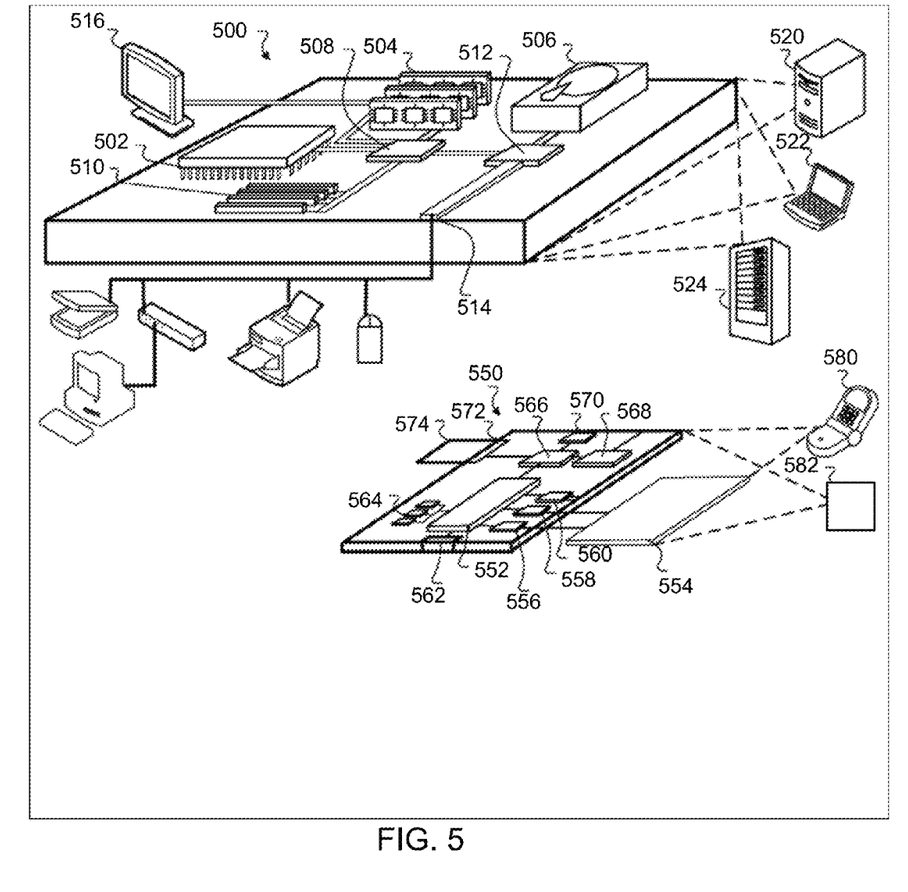
FIG. 5 shows an example of a computer device and a mobile computer device that can be used to implement embodiments of the present disclosure.

Referring now to FIG. 5, an example of a generic computer device 500 and a generic mobile computer device 550, which may be used with the techniques described herein is provided. Computing device 500 is intended to represent various forms of digital computers, such as tablet computers, laptops, desktops, workstations, personal digital assistants, servers, blade servers, mainframes, and other appropriate computers. In some embodiments, computing device 550 can include various forms of mobile devices, such as personal digital assistants, cellular telephones, smartphones, and other similar computing devices. Computing device 550 and/or computing device 500 may also include other devices, such as televisions with one or more processors embedded therein or attached thereto. The components shown here, their connections and relationships, and their functions, are meant to be exemplary only, and are not meant to limit implementations of the inventions described and/or claimed in this document.

In some embodiments, computing device 500 may include processor 502, memory 504, a storage device 506, a high-speed interface 508 connecting to memory 504 and high-speed expansion ports 510, and a low speed interface 512 connecting to low speed bus 514 and storage device 506. Each of the components 502, 504, 506, 508, 510, and 512, may be interconnected using various busses, and may be mounted on a common motherboard or in other manners as appropriate. The processor 502 can process instructions for execution within the computing device 500, including instructions stored in the memory 504 or on the storage device 506 to display graphical information for a GUI on an external input/output device, such as display 516 coupled to high speed interface 508. In other implementations, multiple processors and/or multiple buses may be used, as appropriate, along with multiple memories and types of memory. Also, multiple computing devices 500 may be connected, with each device providing portions of the necessary operations (e.g., as a server bank, a group of blade servers, or a multi-processor system).

Memory 504 may store information within the computing device 500. In one implementation, the memory 504 may be a volatile memory unit or units. In another implementation, the memory 504 may be a non-volatile memory unit or units. The memory 504 may also be another form of computer-readable medium, such as a magnetic or optical disk.

Storage device 506 may be capable of providing mass storage for the computing device 500. In one implementation, the storage device 506 may be or contain a computer-readable medium, such as a floppy disk device, a hard disk device, an optical disk device, or a tape device, a flash memory or other similar solid state memory device, or an array of devices, including devices in a storage area network or other configurations. A computer program product can be tangibly embodied in an information carrier. The computer program product may also contain instructions that, when executed, perform one or more methods, such as those described above. The information carrier is a computer- or machine-readable medium, such as the memory 504, the storage device 506, memory on processor 502, or a propagated signal.

High speed controller 508 may manage bandwidth-intensive operations for the computing device 500, while the low speed controller 512 may manage lower bandwidth-intensive operations. Such allocation of functions is exemplary only. In one implementation, the high-speed controller 508 may be coupled to memory 504, display 516 (e.g., through a graphics processor or accelerator), and to high-speed expansion ports 510, which may accept various expansion cards (not shown). In the implementation, low-speed controller 512 is coupled to storage device 506 and low-speed expansion port 514. The low-speed expansion port, which may include various communication ports (e.g., USB, Bluetooth, Ethernet, wireless Ethernet) may be coupled to one or more input/output devices, such as a keyboard, a pointing device, a scanner, or a networking device such as a switch or router, e.g., through a network adapter.

Computing device 500 may be implemented in a number of different forms, as shown in the figure. For example, it may be implemented as a standard server 520, or multiple times in a group of such servers. It may also be implemented as part of a rack server system 524. In addition, it may be implemented in a personal computer such as a laptop computer 522. Alternatively, components from computing device 500 may be combined with other components in a mobile device (not shown), such as device 550. Each of such devices may contain one or more of computing device 500, 550, and an entire system may be made up of multiple computing devices 500, 550 communicating with each other.

Computing device 550 may include a processor 552, memory 554, an input/output device such as a display 554, a communication interface 566, and a transceiver 568, among other components. The device 550 may also be provided with a storage device, such as a micro-drive or other device, to provide additional storage. Each of the components 550, 552, 554, 584, 566, and 568, may be interconnected using various buses, and several of the components may be mounted on a common motherboard or in other manners as appropriate.

Processor 552 may execute instructions within the computing device 550, including instructions stored in the memory 564. The processor may be implemented as a chipset of chips that include separate and multiple analog and digital processors. The processor may provide, for example, for coordination of the other components of the device 550, such as control of user interfaces, applications run by device 550, and wireless communication by device 550.

In some embodiments, processor 552 may communicate with a user through control interface 558 and display interface 556 coupled to a display 554. The display 554 may be, for example, a TFT LCD (Thin-Film-Transistor Liquid Crystal Display) or an OLED (Organic Light Emitting Diode) display, or other appropriate display technology. The display interface 556 may comprise appropriate circuitry for driving the display 554 to present graphical and other information to a user. The control interface 558 may receive commands from a user and convert them for submission to the processor 552. In addition, an external interface 562 may be provided in communication with processor 552, so as to enable near area communication of device 550 with other devices. External interface 562 may provide, for example, for wired communication in some implementations, or for wireless communication in other implementations, and multiple interfaces may also be used.

In some embodiments, memory 564 may store information within the computing device 550. The memory 564 can be implemented as one or more of a computer-readable medium or media, a volatile memory unit or units, or a non-volatile memory unit or units. Expansion memory 574 may also be provided and connected to device 550 through expansion interface 572, which may include, for example, a SIMM (Single In Line Memory Module) card interface. Such expansion memory 574 may provide extra storage space for device 550, or may also store applications or other information for device 550. Specifically, expansion memory 574 may include instructions to carry out or supplement the processes described above, and may include secure information also. Thus, for example, expansion memory 574 may be provide as a security module for device 550, and may be programmed with instructions that permit secure use of device 550. In addition, secure applications may be provided via the SIMM cards, along with additional information, such as placing identifying information on the SIMM card in a non-hackable manner.

The memory may include, for example, flash memory and/or NVRAM memory, as discussed below. In one implementation, a computer program product is tangibly embodied in an information carrier. The computer program product may contain instructions that, when executed, perform one or more methods, such as those described above. The information carrier may be a computer- or machine-readable medium, such as the memory 564, expansion memory 574, memory on processor 552, or a propagated signal that may be received, for example, over transceiver 568 or external interface 562.

Device 550 may communicate wirelessly through communication interface 566, which may include digital signal processing circuitry where necessary. Communication interface 566 may provide for communications under various modes or protocols, such as GSM voice calls, SMS, EMS, or MMS speech recognition, CDMA, TDMA, PDC, WCDMA, CDMA2000, or GPRS, among others. Such communication may occur, for example, through radio-frequency transceiver 568. In addition, short-range communication may occur, such as using a Bluetooth, WiFi, or other such transceiver (not shown). In addition, GPS (Global Positioning System) receiver module 570 may provide additional navigation- and location-related wireless data to device 550, which may be used as appropriate by applications running on device 550.

Device 550 may also communicate audibly using audio codec 560, which may receive spoken information from a user and convert it to usable digital information. Audio codec 560 may likewise generate audible sound for a user, such as through a speaker, e.g., in a handset of device 550. Such sound may include sound from voice telephone calls, may include recorded sound (e.g., voice messages, music files, etc.) and may also include sound generated by applications operating on device 550.

Computing device 550 may be implemented in a number of different forms, as shown in the figure. For example, it may be implemented as a cellular telephone 580. It may also be implemented as part of a smartphone 582, personal digital assistant, remote control, or other similar mobile device.

Various implementations of the systems and techniques described here can be realized in digital electronic circuitry, integrated circuitry, specially designed ASICs (application specific integrated circuits), computer hardware, firmware, software, and/or combinations thereof. These various implementations can include implementation in one or more computer programs that are executable and/or interpretable on a programmable system including at least one programmable processor, which may be special or general purpose, coupled to receive data and instructions from, and to transmit data and instructions to, a storage system, at least one input device, and at least one output device.

These computer programs (also known as programs, software, software applications or code) include machine instructions for a programmable processor, and can be implemented in a high-level procedural and/or object-oriented programming language, and/or in assembly/machine language. As used herein, the terms "machine-readable medium" "computer-readable medium" refers to any computer program product, apparatus and/or device (e.g., magnetic discs, optical disks, memory, Programmable Logic Devices (PLDs)) used to provide machine instructions and/or data to a programmable processor, including a machine-readable medium that receives machine instructions as a machine-readable signal. The term "machine-readable signal" refers to any signal used to provide machine instructions and/or data to a programmable processor.

As will be appreciated by one skilled in the art, the present disclosure may be embodied as a method, system, or computer program product. Accordingly, the present disclosure may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, the present disclosure may take the form of a computer program product on a computer-usable storage medium having computer-usable program code embodied in the medium.

Any suitable computer usable or computer readable medium may be utilized. The computer-usable or computer-readable medium may be, for example but not limited to, an electronic, magnetic, optical, electromagnetic, infrared, or semiconductor system, apparatus, device, or propagation medium. More specific examples (a non-exhaustive list) of the computer-readable medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a transmission media such as those supporting the Internet or an intranet, or a magnetic storage device. Note that the computer-usable or computer-readable medium could even be paper or another suitable medium upon which the program is printed, as the program can be electronically captured, via, for instance, optical scanning of the paper or other medium, then compiled, interpreted, or otherwise processed in a suitable manner, if necessary, and then stored in a computer memory. In the context of this document, a computer-usable or computer-readable medium may be any medium that can contain, store, communicate, propagate, or transport the program for use by or in connection with the instruction execution system, apparatus, or device.

Computer program code for carrying out operations of the present disclosure may be written in an object oriented programming language such as Java, Smalltalk, C++ or the like. However, the computer program code for carrying out operations of the present disclosure may also be written in conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through a local area network (LAN) or a wide area network (WAN), or the connection may be made to an external computer (for example, through the Internet using an Internet Service Provider). Any examples of code provided in the present disclosure are provided merely by way of example and are only provided as one possible way in, which the teachings of the present disclosure may be implemented.

The present disclosure is described below with reference to flowchart illustrations and/or block diagrams of methods, apparatus (systems) and computer program products according to embodiments of the disclosure. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer-readable memory that can direct a computer or other programmable data processing apparatus to function in a particular manner, such that the instructions stored in the computer-readable memory produce an article of manufacture including instruction means which implement the function/act specified in the flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide steps for implementing the functions/acts specified in the flowchart and/or block diagram block or blocks.

To provide for interaction with a user, the systems and techniques described here can be implemented on a computer having a display device (e.g., a CRT (cathode ray tube) or LCD (liquid crystal display) monitor) for displaying information to the user and a keyboard and a pointing device (e.g., a mouse or a trackball) by which the user can provide input to the computer. Other kinds of devices can be used to provide for interaction with a user as well; for example, feedback provided to the user can be any form of sensory feedback (e.g., visual feedback, auditory feedback, or tactile feedback); and input from the user can be received in any form, including acoustic, speech, or tactile input.

The systems and techniques described here may be implemented in a computing system that includes a back end component (e.g., as a data server), or that includes a middleware component (e.g., an application server), or that includes a front end component (e.g., a client computer having a graphical user interface or a Web browser through which a user can interact with an implementation of the systems and techniques described here), or any combination of such back end, middleware, or front end components. The components of the system can be interconnected by any form or medium of digital data communication (e.g., a communication network). Examples of communication networks include a local area network ("LAN"), a wide area network ("WAN"), and the Internet.

The computing system may include clients and servers. A client and server are generally remote from each other and typically interact through a communication network. The relationship of client and server arises by virtue of computer programs running on the respective computers and having a client-server relationship to each other.

The flowchart and block diagrams in the figures illustrate the architecture, functionality, and operation of possible implementations of systems, methods and computer program products according to various embodiments of the present disclosure. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The terminology used herein is for the purpose of describing particular embodiments only and is not intended to be limiting of the disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present disclosure has been presented for purposes of illustration and description, but is not intended to be exhaustive or limited to the disclosure in the form disclosed. Many modifications and variations will be apparent to those of ordinary skill in the art without departing from the scope and spirit of the disclosure. The embodiment was chosen and described in order to best explain the principles of the disclosure and the practical application, and to enable others of ordinary skill in the art to understand the disclosure for various embodiments with various modifications as are suited to the particular use contemplated.

Having thus described the disclosure of the present application in detail and by reference to embodiments thereof, it will be apparent that modifications and variations are possible without departing from the scope of the disclosure defined in the appended claims.

What is claimed is:

1. A compressed domain language identification method comprising:
   receiving a bitstream of a sequence of packets at one or more computing devices;
   classifying each packet into speech or non-speech based upon, at least in part, compressed domain voice activity detection (VAD);
   extracting a pseudo-cepstral representation from the speech detected packets and partially decoding without extracting a PCM format;
   generating a sequence of multi-frames, based upon, at least in part, the pseudo-cepstral representation; and
   providing in real time the sequence of multi-frames to a deep neural network (DNN), wherein the DNN has been trained off-line for one or more desired target languages.

2. The method of claim 1, further comprising:
   automatically detecting a language associated with the bitstream of the sequence of packets.

3. The method of claim 1, wherein extracting includes extracting from a non-decoded bitstream of the sequence of packets.

4. The method of claim 1, wherein extracting includes a delta computation and a delta-delta computation.

5. The method of claim 1, further comprising:
   discarding one or more non-speech frames using a compressed domain voice activity detector (VAD).

6. The method of claim 1, wherein the DNN is configured to classify the bitstream as belonging to a particular language.

7. The method of claim 6, further comprising:
   averaging a logarithm of posterior possibilities of the DNN across one or more packets to detect the particular language.

8. The method of claim 1, further comprising:
   detecting a language associated with the bitstream of the sequence of packets without decoding into a pulse code modulated format.

9. The method of claim 1, further comprising:
   receiving an output score from the DNN; and
   combining the output score with a pulse code modulated (PCM) language identification system score.

10. The method of claim 6, further comprising:
    performing an action based upon the classification, wherein the action includes at least one of, automatically routing a call in a call center, non-intrusively obtaining statistics regarding language usage in a network, and performing speaker identification.

11. A system for compressed domain language identification, the system including at least one processor configured to perform operations comprising:
    receiving a bitstream of a sequence of packets at one or more computing devices;
    classifying each packet into speech or non-speech based upon, at least in part, compressed domain voice activity detection (VAD);
    extracting a pseudo-cepstral representation from the speech detected packets and partially decoding without extracting a PCM format;
    generating a sequence of multi-frames, based upon, at least in part, the pseudo-cepstral representation; and
    providing in real time the sequence of multi-frames to a deep neural network (DNN), wherein the DNN has been trained off-line for one or more desired target languages.

12. The system of claim 11, further comprising:
    automatically detecting a language associated with the bitstream of the sequence of packets.

13. The system of claim 11, wherein extracting includes extracting from a non-decoded bitstream of the sequence of packets.

14. The system of claim 11, wherein extracting includes a delta computation and a delta-delta computation.

15. The system of claim 11, further comprising:
    discarding one or more non-speech frames using a compressed domain voice activity detector (VAD).

16. The system of claim 11, wherein the DNN is configured to classify the bitstream as belonging to a particular language.

17. The system of claim 16, further comprising:
averaging a logarithm of posterior possibilities of the DNN across one or more packets to detect the particular language.

18. The system of claim 11, further comprising:
detecting a language associated with the bitstream of the sequence of packets without decoding into a pulse code modulated format.

19. The system of claim 11, further comprising:
receiving an output score from the DNN; and
combining the output score with a pulse code modulated (PCM) language identification system score.

20. The system of claim 16, further comprising:
performing an action based upon the classification, wherein the action includes at least one of, automatically routing a call in a call center, non-intrusively obtaining statistics regarding language usage in a network, and performing speaker identification.

* * * * *